UNITED STATES PATENT OFFICE.

HOWARD SPENCE AND WILLIAM BASIL LLEWELLYN, OF MANCHESTER, ENGLAND, ASSIGNORS TO PETER SPENCE & SONS, LIMITED, OF MANCHESTER, ENGLAND.

TREATMENT OF ALUMINOUS COMPOUNDS.

1,256,605.

Specification of Letters Patent. Patented Feb. 19, 1918.

No Drawing. Application filed November 3, 1917. Serial No. 200,045.

*To all whom it may concern:*

Be it known that we, HOWARD SPENCE and WILLIAM BASIL LLEWELLYN, subjects of the King of Great Britain and Ireland, and residents of Manchester, in the county of Lancaster, England, have invented certain new and useful Improvements in the Treatment of Aluminous Compounds, of which the following is a specification.

The present methods of treating alunite and the like for efficiently recovering in a valuable form the useful substances contained therein, namely alumina, alkali sulfate, and sulfuric acid, are difficult or costly. For example, the method of dissolving alunite, after roasting to render it more soluble, in sulfuric acid usually involves the recovery of the alkali and part of the alumina present in the form of alum, and of the rest of the alumina as sulfate, and brings into solution a considerable proportion of iron or other impurities present. The method of igniting at a high temperature to drive off sulfuric anhydrid, as $SO_2$ and $SO_3$, and leave a residue which, on treatment with water, gives up the contained alkali as sulfate leaving the alumina in an inert condition, is costly, as the alumina is thereby left contaminated with any other impurities contained in the mineral, *e. g.* silica and iron oxid, thus rendering it in most cases unfit, without further treatment, for use as pure alumina, or for the manufacture of metallic aluminium.

This invention consists in treating alunite or the like in a cheap and simple manner so as to obtain a high proportion of the contained alumina in a pure and suitable condition for conversion into other forms, or compounds, of alumina, and also to obtain a high proportion of the alkali as sulfate. In carrying the invention into effect, the alunite or the like is ignited under suitable conditions in order, as is well known, to bring it into a condition of maximum solubility. When so prepared, and preferably in a finely divided condition, it is hydrated and treated with a solution of sulfurous acid gas, either in the cold or at elevated temperatures and at atmospheric or higher pressures. This may suitably be carried out by suspending the alunite in, or surrounding it with, water or other suitable medium, and passing in sulfurous acid gas. Agitation and the employment of a number of vessels in series offer effective means of carrying out the operations. By these means very high proportions of the alkali, of the sulfuric acid, and of the alumina may be brought into solution, while silica and gangue remain undissolved.

The solution, after separation by filtration or otherwise from the insoluble and undissolved matters, is then heated to drive off sulfurous acid gas, and the alumina then precipitates in the form of granular basic sulfate or sulfates in a practically pure form easily separated from the solution by known means. During these operations, air is excluded so far as practicable in order to avoid the oxidation and precipitation of any iron present. The residual solution contains practically all the iron. The basic aluminum sulfate thus substantially free from iron, may be readily converted into other aluminous compounds, or into pure alumina by ignition. The precipitated basic aluminum sulfate is not only highly pure, but is also readily soluble in even weak or dilute acids, *e. g.* acetic acid.

It is important to have present in this solution not more than one molecule, and preferably less, of neutralizable $SO_3$ (*i. e.* the quantity of $SO_3$ present over and above the amount required to combine as neutral sulfates with the alkalis or alkaline earths present) to one molecule $Al_2O_3$, as otherwise the precipitate will contain basic double alkali aluminum sulfate and considerable alumina may remain in solution. If necessary, the proportion of neutralizable $SO_3$ may be corrected by the addition of a calculated quantity of an alkali or alkali earth, *e. g.* milk of lime, preferably before separation from the insoluble matter. This result can also be readily achieved by removal of a part of the alumina, acid and potash as alum (when using potash alunite) or by the addition of any suitable soluble form of alumina or by other known means.

The sulfurous acid gas driven off may be recovered by known means for re-use.

The residual solution if necessary after precipitation by known means of any iron compounds, is then treated for the recovery therefrom of alkali sulfate in any suitable way, for example, by evaporation.

The following is an example of how this process may be carried out:—

The ignited alunite, in a powdered condition is preferably hydrated in the cold, or at slightly elevated temperatures, by wetting or soaking in water or liquor from a previous operation. The hydration may, according to the nature or condition of the alunite, extend over a shorter or longer period. In some cases, a period of some weeks is advantageous. The hydrated alunite is then agitated in the liquor in a suitable closed vessel and sulfurous acid gas is added during the agitation until as much of the soluble compounds as will dissolve have come into solution. A proportion of three and a half weights of liquor to one of ignited alunite is suitable. This treatment with sulfurous acid gas may cause a considerable rise in temperature which is suitably maintained by known means at about 40° C. during the treatment which is usually complete in a few hours. Temperatures about this degree are suitable for the operations as they prevent potash alum crystallizing out (when using potash alunite), give a good attack on the alunite and at the same time are not high enough to cause decomposition of the solutions. The solution is now tested to determine the ratio of alumina to neutralizable sulfuric acid and is adjusted as previously indicated, so that there shall be a ratio of one molecule of $Al_2O_3$ to about 0.9 molecule of neutralizable $SO_3$ and the clear liquor is then separated from the insoluble matter by known means The clear liquor, with exclusion of air is then heated to drive out the sulfurous acid gas (which is recovered for re-use). Over 90% of the alumina may thus be thrown down as basic aluminum sulfate in an easily filterable condition and practically all the iron remains in the solution. The basic aluminum sulfate, preferably with exclusion of air, is separated and washed and utilized in any desired manner.

Although it has the disadvantage of obtaining more dilute residual solutions containing alkali sulfate, we prefer to precipitate the basic aluminum sulfate from solutions which do not contain too high a percentage of alumina and from solutions of less strength than are obtained when using the hereinbefore-mentioned proportions of alunite and liquor, as otherwise there is a tendency to obtain a proportion of double alkali aluminum sulfate in the precipitate and it is less readily soluble in acid, a solution, e. g. containing about 5 grams $Al_2O_3$ per 100 c. c. being found to be suitable.

We may carry out the herein described operations in or by any convenient means and in any convenient manner and we do not confine ourselves to the precise details of the operations herein described, which are given for purposes of illustration only.

The basic aluminum sulfate precipitate may be dried at ordinary or slightly elevated temperatures to a powder containing about 30% $Al_2O_3$ and in addition to being readily soluble in acids it may be ignited to drive off water and sulfuric anhydrid leaving a residue of practically pure $Al_2O_3$ suitable for known uses.

What we claim as our invention and desire to secure by Letters Patent is:—

1. The process of obtaining basic aluminum sulfate which comprises heating a sulfurous acid solution containing alumina and sulfuric acid.

2. The process of treating ignited alunite which comprises treating ignited alunite with a sulfurous acid solution, separating the clear solution, and in then heating the clear solution.

3. The process of treating ignited alunite which comprises treating ignited alunite with sulfurous acid solution to obtain a high proportion of the alumina alkali and sulfuric acid in solution.

4. The process of treating ignited alunite which comprises treating ignited alunite with sulfurous acid solution, then adjusting the ratio of neutralizable sulfuric acid to alumina substantially to less than one molecule $SO_3$ to one molecule $Al_2O_3$, separating the clear solution, and heating the clear solution.

5. The process of treating ignited alunite which comprises treating ignited alunite with a sulfurous acid solution, then adjusting the ratio of neutralizable sulfuric acid to alumina substantially to less than one molecule $SO_3$ to one molecule $Al_2O_3$, separating the clear solution, heating the clear solution to precipitate basic aluminum sulfate, separating the basic aluminum sulfate from the residual liquor, and recovering the alkali sulfate from said liquor.

6. In the process of treating ignited alunite, the step which comprises treating ignited alunite with a sulfurous acid solution and in then adjusting the ratio of neutralizable sulfuric acid to alumina substantially to less than one molecule $SO_3$ to one molecule $Al_2O_3$.

In witness whereof we have hereunto set our hands.

HOWARD SPENCE.
WILLIAM BASIL LLEWELLYN.